MARK SENSING

Filed Sept. 13, 1961

6 Sheets-Sheet 1

INVENTORS
F. H STITES
R. ALEXANDER
BY F. J. Sullivan
Att'y

INVENTORS
F. H. STITES
R. ALEXANDER
BY F. L. Sullivan
Att'y

INVENTORS
F. H. STITES
R. ALEXANDER
BY F. L. Sullivan
Att'y

INVENTORS
F. H. STITES
R. ALEXANDER
BY F. I. Sullivan
Att'y

INVENTORS
F. H. STITES
R. ALEXANDER
BY F. H. Sullivan
Att'y

Dec. 21, 1965 F. H. STITES ETAL 3,225,177

MARK SENSING

Filed Sept. 13, 1961 6 Sheets-Sheet 6

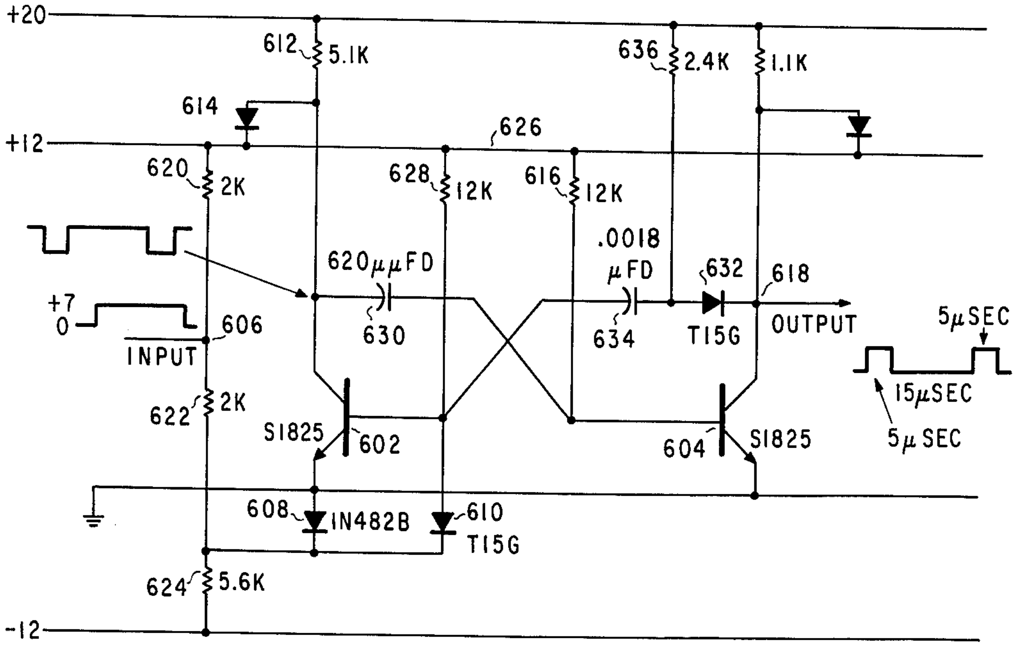

Fig. 6

| | TELETYPE CODE LINE 1 | 2 | 3 | 4 | 5 | LABEL CODE 1ST STRIPE | 2ND STRIPE |
|---|---|---|---|---|---|---|---|
| 1 | X | X | X | 0 | X | W | W |
| 2 | X | X | 0 | 0 | X | W | 0 |
| 3 | X | 0 | 0 | 0 | 0 | 0 | BLANK |
| 4 | 0 | X | 0 | X | 0 | 0 | 0 * |
| 5 | 0 | 0 | 0 | 0 | X | B | BLANK |
| 6 | X | 0 | X | 0 | X | W | B |
| 7 | X | X | X | 0 | 0 | 0 | W |
| 8 | 0 | X | X | 0 | 0 | W | BLANK * |
| 9 | 0 | 0 | 0 | X | X | B | B * |
| 0 | 0 | X | X | 0 | X | B | W |

LEGEND:
W = WHITE
0 = ORANGE
B = BLUE

* REQUIRES CONVERSION

ORANGE CHANNEL FOR STRIPE #1 IS CONNECTED TO TELETYPE LINE #1
BLUE CHANNEL FOR STRIPE #1 IS CONNECTED TO TELETYPE LINE #5
ORANGE CHANNEL FOR STRIPE #2 IS CONNECTED TO TELETYPE LINE #2
BLUE CHANNEL FOR STRIPE #2 IS CONNECTED TO TELETYPE LINE #3

Fig. 7

INVENTORS
F. H. STITES
R. ALEXANDER
BY F. L. Sullivan
Att'y

United States Patent Office 3,225,177

Patented Dec. 21, 1965

3,225,177

MARK SENSING

Francis H. Stites, Wayland, Mass., and Raymond Alexander, East Aurora, N.Y., assignors to Sylvania Electric Products Inc., a corporation of Delaware Filed Sept. 13, 1961, Ser. No. 137,918
22 Claims. (Cl. 235—61.11)

This invention is concerned with automated mark sensing and particularly with improvements in optically sensible markings and optical-electronic transducers useful, for example, in label reading systems for identifying transportation vehicles.

Present technological development has reached a point where significant progress could be made if an economically feasible and reliable means could be provided for remote sensing of identifying indicia on objects moving past or otherwise presented to an automated reading device. A typical example is the identification of railroad cars, motor transport vehicles, etc. as they pass checkpoints. It has for several years been recognized that the control made possible by such identification could be employed to introduce economies and increase operating efficiencies by providing an input for automated data processing and vehicle control in the transportation industry. Many attempts have been made to solve this identification problem with radio frequency, radioactive, magnetic and optical identification devices and techniques. None of the proferred solutions, however, has enjoyed significant acceptance. A general criticism has been that they are too expensive or too unreliable for applications requiring widespread heavy usage.

The following is a brief analysis of some specific difficulties that have been experienced with these previous attempts at solving the remote reading problem. Perhaps the major difficulty has been the cost of a reliable encoding device or label. A primary requirement is that the label or other identifying indicia carried by the objects to be identified be rugged and inexpensive. For example, a system which sets as its goal the task of identifying freight cars in transit across the railroads of the United States and Canada must label approximately two million cars. The labels must be exposed to wide varieties of dust, dirt and climatic conditions for extended periods of time without attention and still be readable through fog, rain and snow. Moreover, a label cost of more than a few dollars per car is a prohibitive burden for the economically depressed railroad industry. Another consideration is that the label scanners must be located trackside and perform their reading operation while trains roll by at speeds of the order of 60 miles per hour, subjecting the equipment to severe mechanical vibration while it is performing the reading operation. Also, the amount of circuitry involved should be kept to an absolute minimum since reliability is an inverse function of the number of circuit components required to accomplish the desired reading task.

This dilemma of trade-off between considerations of label economy and reader complexity is exemplified by two problems: (1) reading labels in either direction, since railroad cars may be oriented with either end for ward in a particular train consist, and (2) providing accurate system timing for actuating enabling gates in synchronism with the passage of individual identification elements such as coded markings as a moving train carries a label through the scanning field of view. In order to solve the first, i.e. reading from either direction, problem it has hitherto been necessary to provide front and rear labels or labels of double width which read the same frontwards and backwards. The only alternative to doubling the label cost in this manner has been to increase system complexity by adding decision circuitry to the reading device so that it can determine, by some appropriate system of encoding and decoding, whether a particular label is being presented to it in a forward or backward sequence of identification digits. Similarly, it has been necessary to add either to the label, or to the reading equipment additional markings or devices to solve the second problem and establish a system timing which will operate gating circuits in a sequential rate related to the speed of the railroad cars past the scanning station so that the equipment will be compatible with a wide range of label passage speeds.

Thus, these difficulties which have been discussed above along with others such as location of the label on a vehicle with certitude that it will be within the field of scan of the reader despite changes in style, shape, tilt, etc. of the vehicle as well as obstructions such as supporting struts on its surface, and yet shield the scanner from daylight and other undesirable reflections have resulted in a situation where, although remote label reading systems which are workable under controlled laboratory conditions have been proposed, these have failed the test of application to practical economic and reliability requirements.

Accordingly, a primary object of the present invention is to provide an improved means for mark sensing and remote label reading. Other objects are to provide: an improved label for use in automated label reading systems; a label and reader combination which is independent of rate of label motion past the reader in the determination of system timing; a label which may be read in the proper sequence of digits independently of the direction of its horizontal motion past the reader; a label reading system which is designed from label and reader viewpoints to be compatible with a five channel teletype code with a minimum of label and reader size and complexity; and, a combination label format and scanning technique which will permit variations in label location and in separation between component digits as different labels are affixed to diffirent sizes and types of railroad cars or other objects to be identified with various physical obstructions upon their surfaces. It is also an object of the invention to provide a labeled transport vehicle identification system wherein labels having a serviceable life extending over a period of years may be read under all types of climatic and road conditions and in all types of weather.

These and related objects have been accomplished in one embodiment of the invention which may be described, for illustrative purposes, as it is applied to the identification of railroad cars passing a scanning station. This embodiment of the invention features the use of labels fabricated from colored stripes of retro-reflective material. As will be explained in more detail below, retro-reflective surfaces reflect almost 100% of a light beam in a very narrow coaxial cone around almost any angle of incidence. These labels represent "start read" and "stop read" signals and the full range of decimal digits one through zero by various two-stripe combinations of orange, blue, white and black stripes combined in a specialized base four, two position code, and are mounted horizontally in a vertical array orientation on the side of the railroad car as distinguished from the horizontal array of a succession of vertical stripes which has hitherto been the practice with similar identification systems. Certain of the digits may be assigned to represent letters of the alphabet whereby each two-stripe combination represents a single alpha-numeric character.

The trackside reading unit includes a source of radiant energy, in the preferred embodiment a source of light, and a rotating drum or wheel with a plurality of mirrors mounted around its periphery. As the wheel rotates, the mirrors cause a light beam to scan the vertical length of the label and the retro-reflected light is divided by a dichroic optical system into orange and blue channels of information. This vertical scanning of a label moving in a horizontal direction has the merit of insuring that the label will always be read in the same direction, e.g. from bottom to top, and permits system timing to be derived from the uniform rotation of the scanning wheel, thus overcoming the burden of coping with variable train speeds which has handicapped prior art systems.

Separate orange and blue channels are provided for the first and second stripes of each coded digit to convert the serial data derived by scanning of the stripes into a four channel parallel representation capable of being processed locally or transmitted to a remote location to provide a printed record or other indication of the identification number on the label being scanned. A significant feature of this four channel arrangement is that it provides direct representation in standard teletype code for seven of the ten decimal digits zero through one. This decreases system cost and increases system reliability by reducing code conversion equipment to a minimum.

An unlabeled car detecting subsystem provides a suitable indication whenever a car passes the reading equipment and a label is not read because of label or equipment deficiencies or because the car is unlabeled.

Other embodiments, features and modifications of the invention will be apparent from the following description of this railroad car identification system, wherein:

FIG. 1 is a diagrammatic representation of the invention as utilized in a railroad car identification system;

FIG. 2*a* is a diagrammatic representation of the light source and optical scanning system of FIG. 1;

FIG. 2*b* is a plan view of a partially-silvered mirror useful in the system of FIG. 2*a*;

FIG. 2*c* is a plan view of an optical mask useful in the system of FIG. 2*a*;

FIG. 3*a* is a diagrammatic representation of a label format representing "start read" and "stop read" signals and the coded equivalent of the decimal digits one through zero;

FIG. 3*b* is a diagrammatic representation of optimized photoelectric cell signal waveforms derived from the label of FIG. 3*a*;

FIG. 3*c* is a diagrammatic representation of communication link line singals transmitting data derived from scanning the "start read," "stop read" instructions and decimal digits one through zero on the label of FIG. 3*a*;

FIG. 6 is a schematic diagram of a gated multivibrator circuit useful in the equipment of FIG. 4; and, FIG. 7 is a schedule of comparison between the standard five position teletype code and the data processing code of the embodiment of the invention under description.

*General description*

Figure 1:
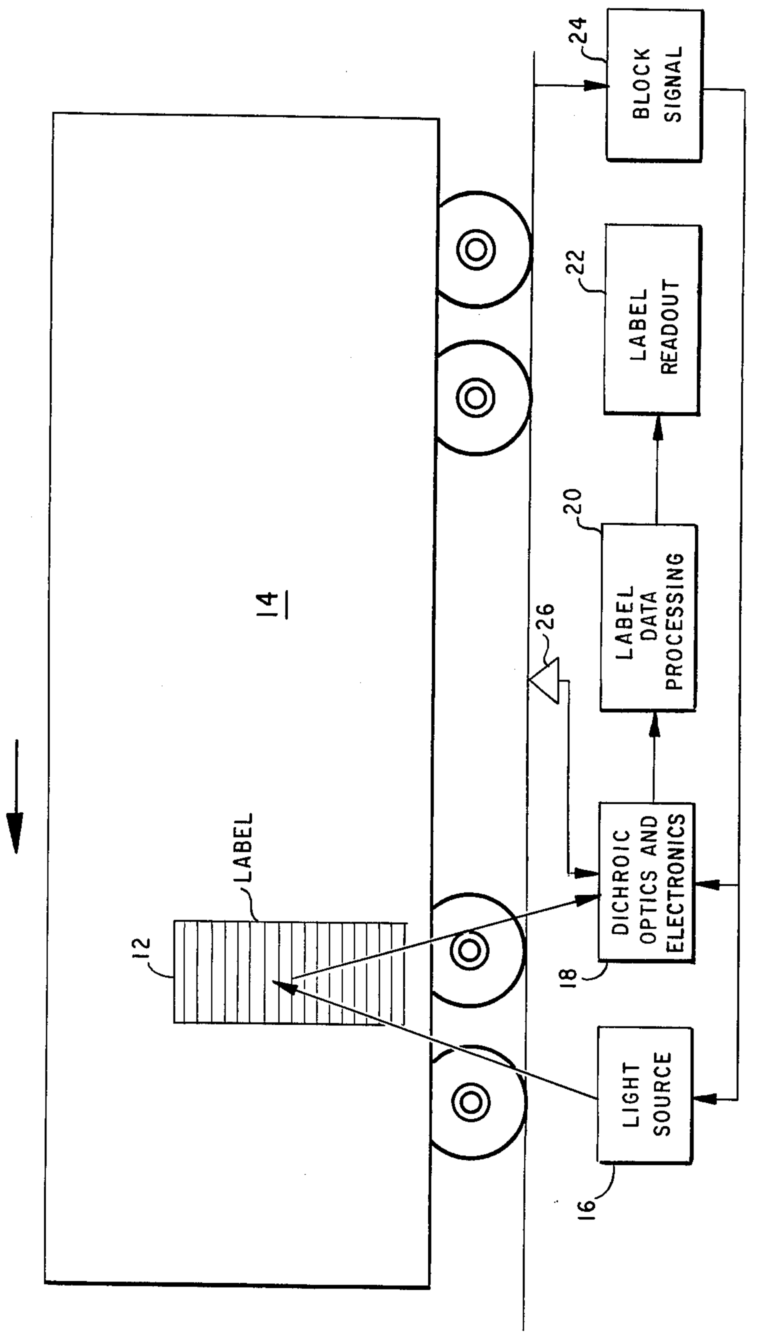

FIG. 1 provides a diagrammatic representation of an illustrative embodiment of the invention wherein it is employed to identify railroad cars passing a scanning station. A label 12 affixed to a railroad car 14 is exposed to a scanning light beam from a source 16, and light reflected from the label is transduced into electrical identification signals by a trackside scanning unit 18 containing appropriate optical equipment and electronic circuits. The information transduced from the label is processed through an electronic decoding system 20 which may be located in the vicinity of the trackside scanner or at a remote location serviced by a radio or wire communication link.

When the data from the label 12 has been properly processed, it is communicated to a label readout device 22 which may be a paper punch, magnetic tape storage unit, teleprinter or other suitable readout device. The system is actuated by control signals from the block signal indicator 24 which is a standard component of railroad equipment. A wheel counter 26 is employed to provide train passage information which is utilized, in a manner which will be explained later, to provide a check on unlabeled or unread cars.

The construction and operation of each of the components of this identification system will be explained in detail under appropriate headings below. Briefly, referring to FIG. 2*a*, light from lamp 28 is reflected by partially-silvered mirror 30 to reflect segments 32 located about the periphery of a rotating wheel 34. The reflected light is further reflected from these surfaces with a scanning motion imparted by the wheel to be retro-reflected along their angle of incidence by the component colored stripes of the label 12. The color coding of these stripes is shown in FIG. 3*a* and is explained in detail under the heading "Label" below. The retro-reflected light is directed back along its path of incidence, off the reflective surfaces 32 and through the partially-silvered mirror 30 to a dichroic mirror 35 which transmits orange light to a first photocell 36 and reflects blue light to a second photocell 38.

Figure 4:
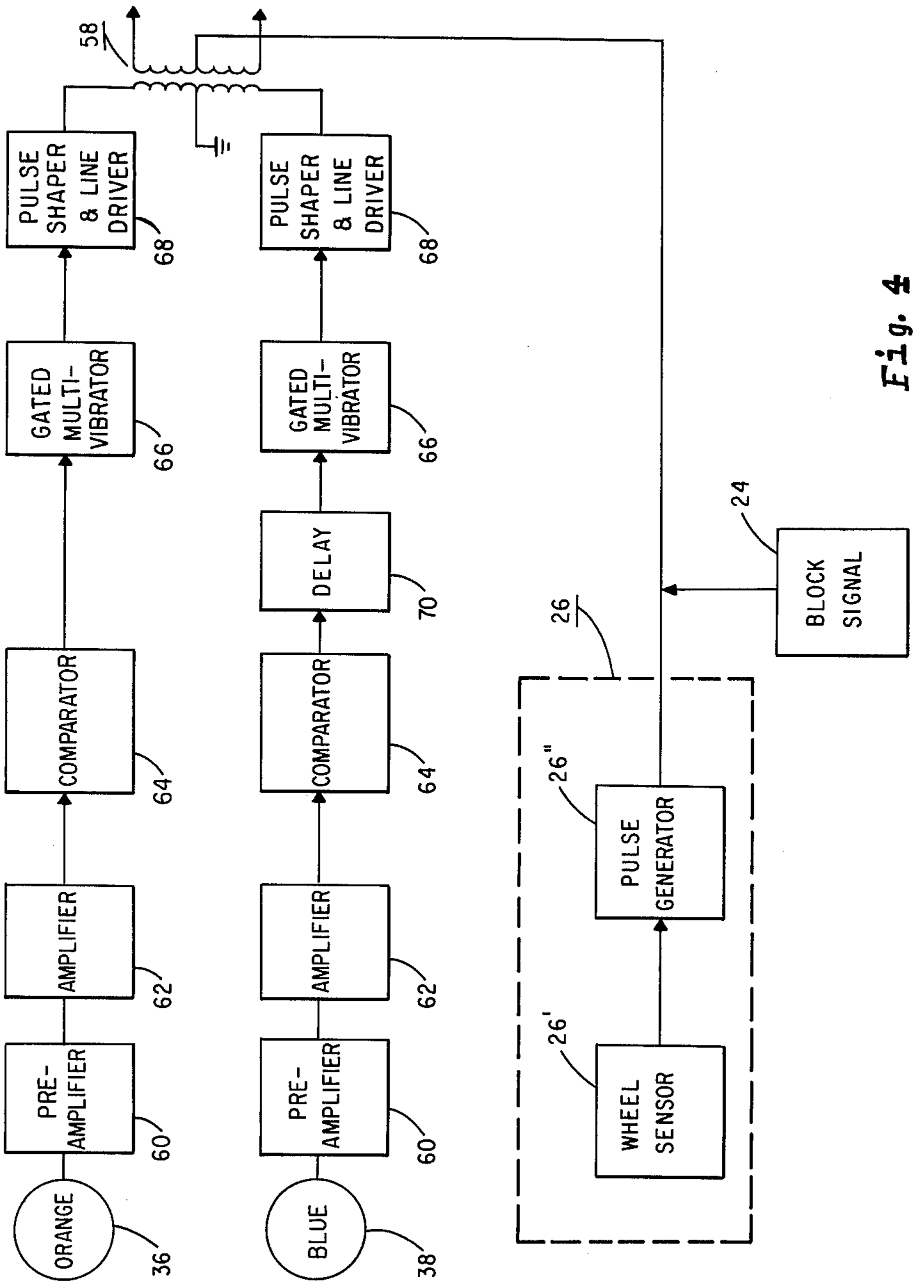
FIG. 4 is a detailed block diagram of the optical to electronic signal transducing equipment employed in this embodiment of the invention.
Figure 5:
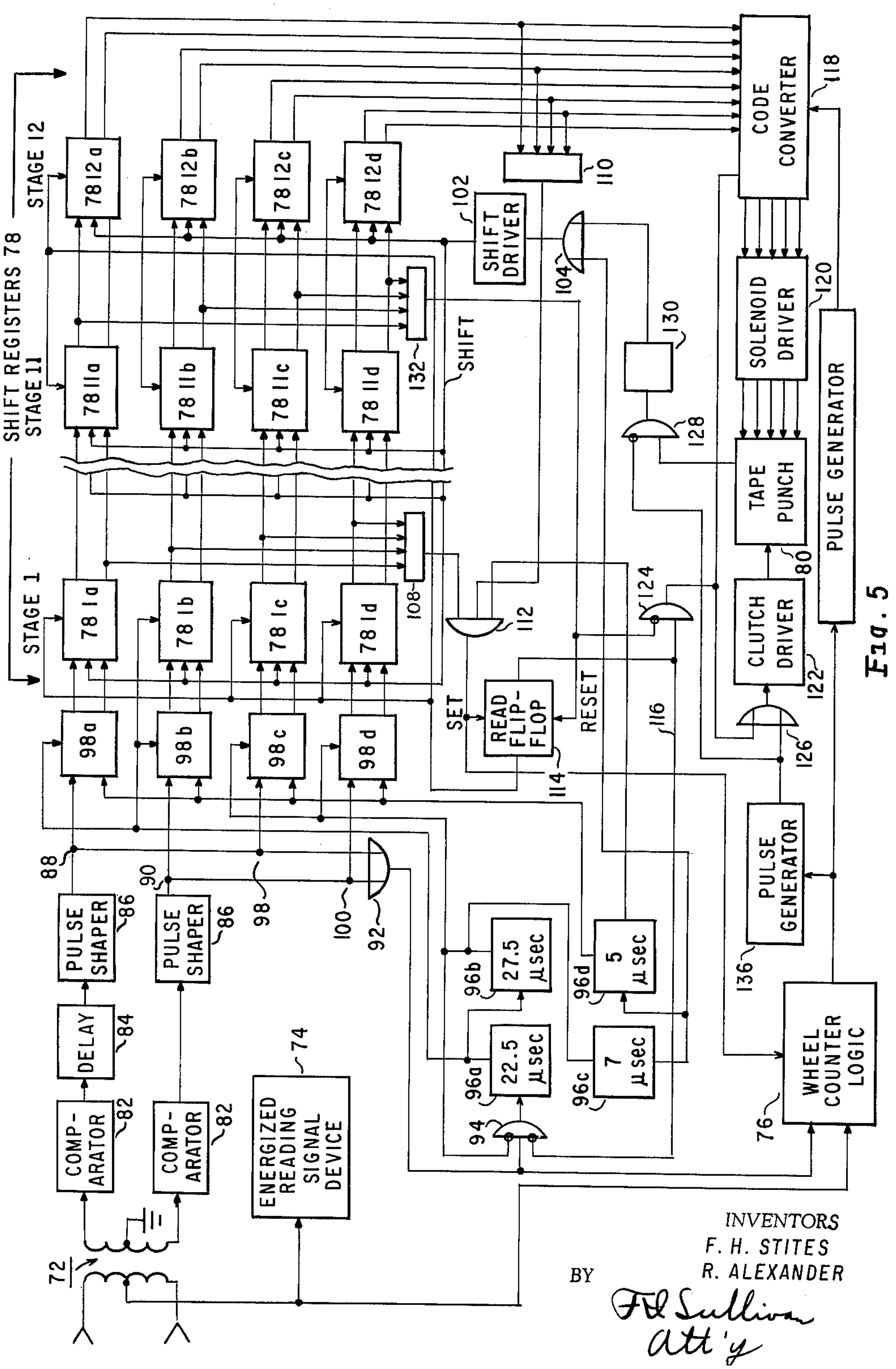
FIG. 5 is a block diagram of a data storage and decoding device for processing the data derived by the reader of FIG. 4.

The orange and blue color responsive signals from the cells 36 and 38, respectively, are processed through the circuits indicated by block 18 in FIG. 1 and shown in more detail in FIG. 4 and are further processed by the apparatus of block 20 in FIG. 1, shown in more detail in FIG. 5, to provide properly coded electronic signals to operate the paper punch or other label readout equipment designated by block 22 in FIG. 1.

*Label*

The label 12 which is employed in this system is represented in FIG. 3*a* with "start read" signals, a representation of each decimal number one through zero, and "stop read" signals, running in the sequence recited, from the bottom to the top of the label in accordance with the scanning direction indicated by arrow 40. Analysis of this code format demonstrates that it is comprised of orange, blue, white (i.e. having a signal response in both the orange and blue portions of the spectrum) and black (i.e. blank or non-reflective) stripes. Since each instruction and digit of the code is represented by two stripes in various combinations of these four colors, the result is a two-position base-four code. This achieves a considerable saving in label size over a binary type code which would require at least four stripes per digit to provide the same encoding capability. An important feature of this particular code is that the black effect of the blank stripes is utilized as a code input but only for the second stripe in a combination because, as will be explained later, system timing pulses are initiated by the light reflected from the first stripe in every two-stripe combination.

As will be explained under the heading "Label Data Processing" below, the leading edge of the pulse which recognizes the first stripe of any pair initiates the generation of two gating pulses which correspond with scanning the first stripe at time $T_1$ and the second stripe at time $T_2$.

FIG. 3b represents an optimization of the signals generated by the photocell 36 in the orange channel and the photocell 38 in the blue channel in response to this scanning operation. For example, a "start read" instruction is derived by reading an orange stripe at time $T_1$ followed by a blue stripe at time $T_2$. Consequently, the orange channel will experience a pulse at time $T_1$ and no pulse at time $T_2$ whereas the blue channel will experience no pulse at time $T_1$ but generate a pulse at time $T_2$. On the other hand, the digit one is represented by a first white stripe at time $T_1$ followed by a second white stripe at time $T_2$. This results in signals in both the orange and the blue channels at both times $T_1$ and $T_2$ since a white reflective stripe includes both blue and orange components in its spectral response. The manner in which the signal responses of the orange and blue photocells are converted into the line signals of FIG. 3c will be explained in more detail below under the heading "Scanning Electronics."

A significant feature of the identification system under discussion is that the label 12 is mounted in a vertical direction, i.e. with its component stripes passing the scanning station simultaneously instead of sequentially. Thus, although the present system loses the obvious advantage of utilizing the motion of the label past the scanner to accomplish the mechanics of sequential scanning, it overcomes the disadvantage of being forced to relate system timing to the speed with which the label passes the scanner. Consequently, the system timing for operating stripe reading gates, etc. is related to the uniform speed of the scanning wheel 34 and need not be adjusted for variable speeds of passing objects. Moreover, since the label may always be read from bottom to top, there is no need to add extra labels to a car or extra circuitry to the data processing equipment to insure that a label is being read frontwards and not backwards. Another benefit of the vertical scan is that it can accommodate a wider range of label height with relation to the scanner than a horizontal scanning system.

A satisfactory material for producing the retroreflective stripes required by this label is the adhesive-backed plastic product sold by Minnesota Mining and Manufacturing Company under the trade name "Scotchlite." This product reflects more than 50% of its incident light in a beam with an angle of less than one-third of a degree from light beams striking its surface at angles of incidence up to 40°. This permits the scanner to be directed slightly off the perpendicular to passing freight cars in order to eliminate the pickup of undesirable signals as a result of specular reflection from other parts of, and materials located upon, the labeled car and still maintain a satisfactory signal to noise ratio. "Scotchlite" is particularly suitable for employment in the present system since its blue and its orange are prepared by imposing suitable color filters overs its basic white and these two particular colors in this product have no significant cross-over of spectral response.

Satisfactory labels for operation with trains passing the scanning station at speeds of up to 60 miles per hour have been fabricated with stripes six inches long and three-eighths of an inch wide with a minimum distance of twenty-two feet between labels. They may be fabricated by preparing quantities of "Scotchlite" in the various two-stripe combinations required with an ink overprint of the particular decimal number or instruction represented and then assembling the proper combinations to represent a complete identification label by mounting them upon another adhesive-backed product of the Minnesota Mining and Manufacturing Company designated by the trade name "Scotchcal." This material is non-reflective and is very suitable for the "blank" (i.e. black) stripes of the code combinations at the same time that it serves as a supporting background.

*Scanning optics*

Figures 2A, 2B, 2C:
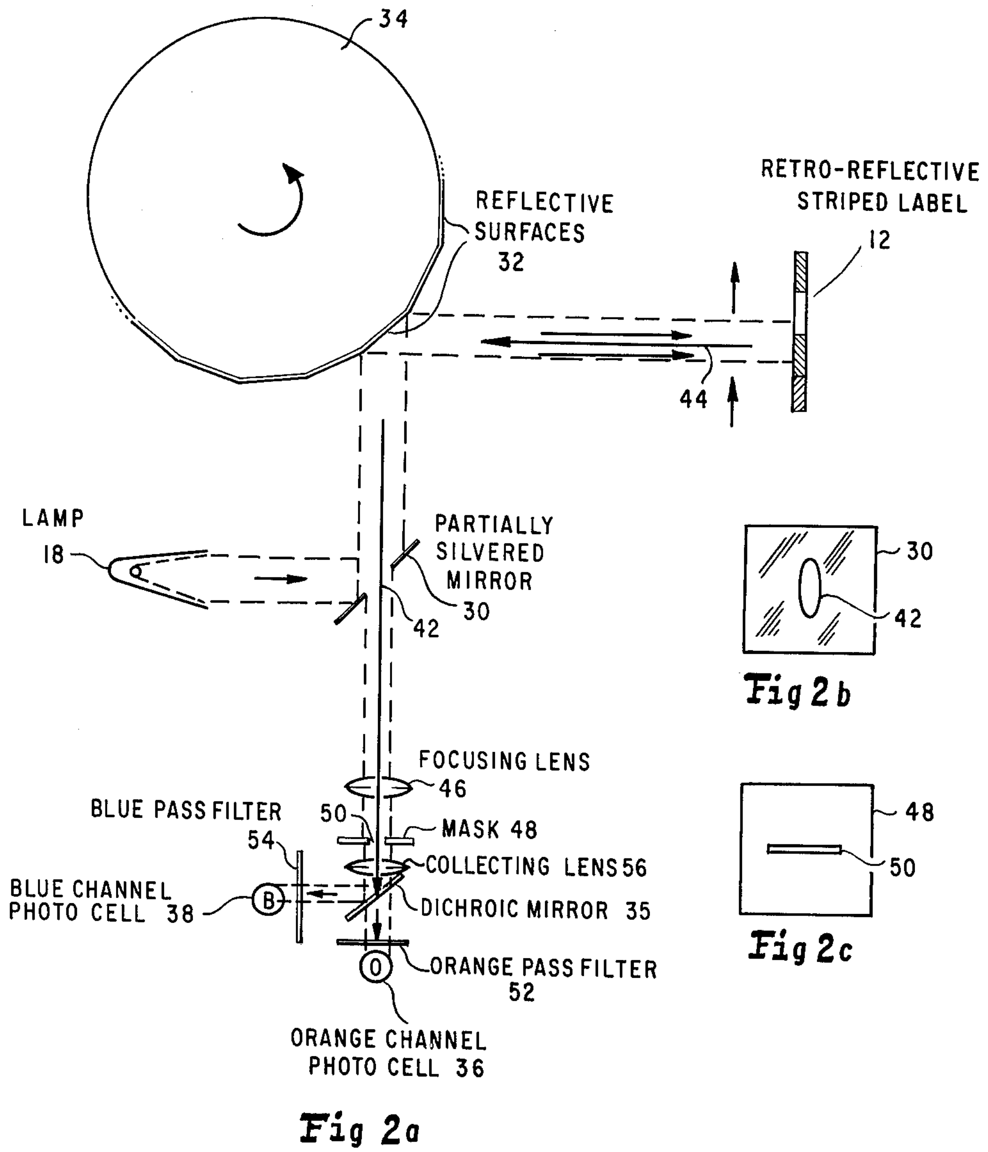
Figures 3A, 3B, 3C:
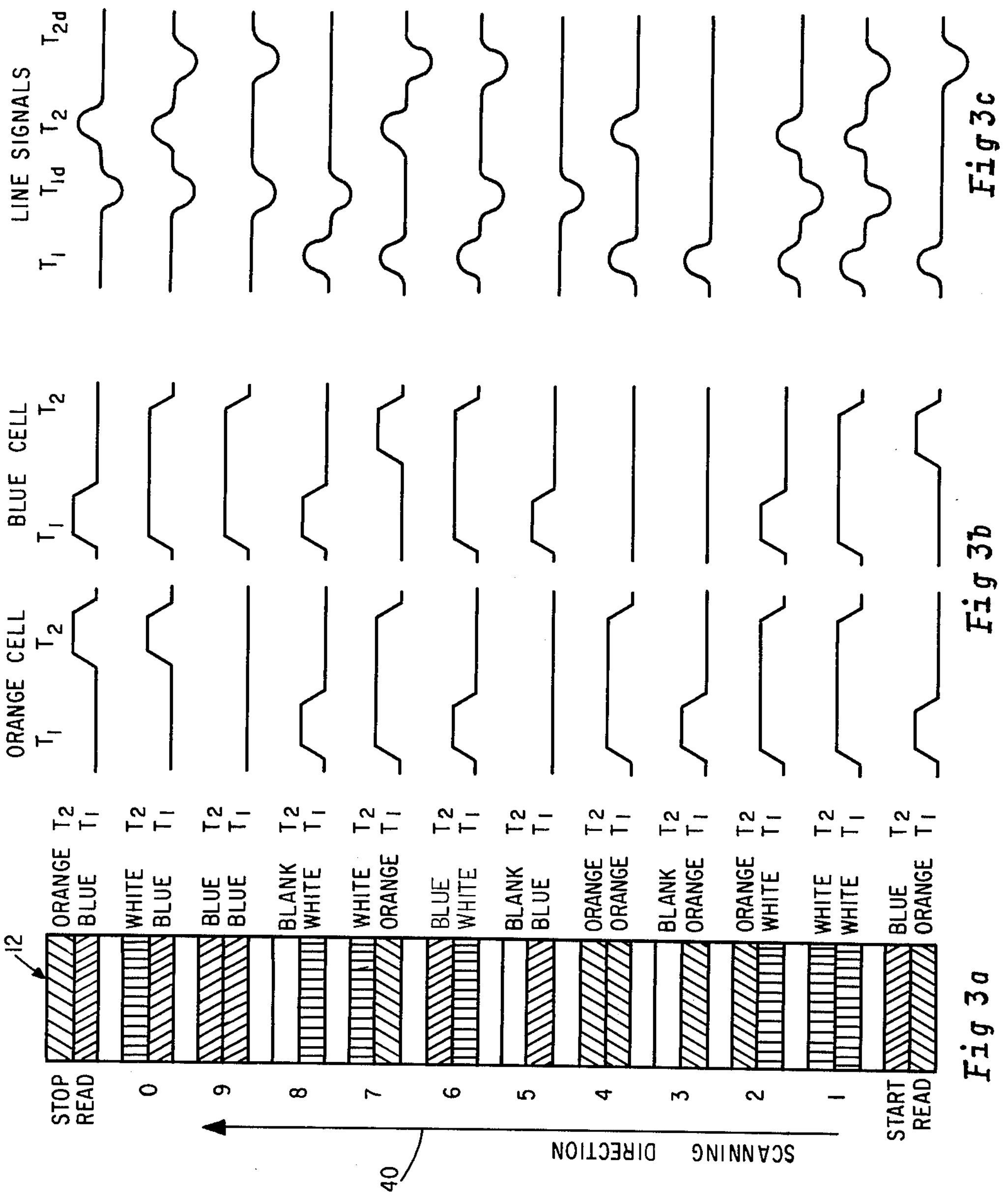

FIG. 2a is a diagrammatic representation of specific details of the optical system employed by the label scanning equipment of the illustrative embodiment of the invention under description. The light source 16 includes a relatively powerful lamp 28 capable of producing a white light which includes radiation in the spectral areas to which the retro-reflective blue and orange of the label 12 is sensitive. For use with "Scotchlite," a standard 28 volt, 100 watt PAR-36 spotlight bulb of the type used for the flashing traffic signals on airliners produces satisfactory results. The partially-silvered mirror 30 toward which this light is directed is shown in plan view in FIG. 2b. The elliptical hole 42 in the center of the mirror presents a circular transmission path for return light reflected from the label, since the diagonal arrangement of the mirror 30 in the equipment assembly converts the ellipse to an effective circle with respect to the light path.

There are fifteen mirrors 32 located around the periphery of the scanning wheel 34 to provide a scanning angle of approximately 48° between half amplitude points. Of this 48°, approximately 40° is utilized. The wheel 34 is fourteen inches in diameter, rotates at 1200 revolutions per minute, and is located approximately six feet from the passing cars. If the label is carried by a train moving at 60 miles per hour, the scannel area moves sideways approximately 3.3 inches between scans; and, during the period that the scan is transversing the label, the car moves approximately .6 inch. Consequently, examination of a ten-inch long field of view less than a label stripe in width during the scanning operation insures that the scanning system will observe a six-inch wide label several times as it passes at speeds of up to 60 miles per hour and "see" the reflection from only one stripe at a time if its reflected light is sampled while this field of view is centered on the stripe.

This selective examination of the label is accomplished in the equipment of FIG. 2a by using a focusing lens 46 to project an image of the label area under scan upon a mask 48. This mask has a slot 50 which measures approximately .5 inch long and .010 inch wide to accommodate the ten-inch view referred to above and insure that the light passing through the mask at any one time will be less than that reflected from any one stripe. This insures that, with proper gating, the information return of only one stripe at a time is sampled.

The light coming through mask 48 is divided into blue and orange components by the dichroic mirror 35 which transmits orange light through orange pass filter 52 to the orange channel input photocell 36 and reflects blue light through blue pass filter 54 to the blue channel input photocell 38. A collecting lens 56 is employed between the mask 48 and the dichroic mirror 35 to insure that their respective incident light beams will be directed to the cathode surfaces of the photocells 36 and 38.

Although white light is generally preferred for illuminating the retro-reflective label because of the ready availability of suitable sources at relatively low cost, other forms of radiant energy associated with the electromagnetic spectrum ranging from the shortest wavelengths down through ultra-violet, visible, and infrared are within the contemplation of the invention.

*Scanning electronics*

The electronic circuits of the trackside scanning unit are represented diagrammatically in FIG. 4. They include an orange information channel connected to the orange light sensing photocell 36, a blue information channel connected to the blue light sensing photocell 38, a wheel count pulse generator connected to the wheel sensor 26' and the block signal indicator 24, all connected to an output line transformer 58.

Each of the color information channels is comprised of a preamplifier stage 60, an amplifier 62, a comparator 64, a gated multivibrator 66, and a pulse shaper and line driver stage 68. The preamplifiers 60 convert the signal response of the photocells to a series of pulses which are processed through amplifiers 62 to the comparators 64. These comparators provide a threshold function by rejecting pulses of less than a given amplitude as noise and accepting pulses of greater than the given amplitude as signal response to a label stripe having a color pertinent to the channel concerned. Signals accepted by the comparators 64 are processed through the gated multivibrators 66 to convert them to standardized pulses of less than $T_1$ or $T_2$ duration to represent signals received (if any) in their respective channels during scanning intervals $T_1$ and $T_2$. These pulses are in turn processed by the pulse shaper and line drivers 68 to produce the line signals shown in FIG. 3*c*.

A suitable gated multivibrator for use in stage 66 is shown schematically in FIG. 6. It is comprised of two transistors 602 and 604 connected in a standard flip-flop configuration with specialized control circuits which cause it to produce one or more pulses of standardized width and separation. The number of pulses depends upon the width of an input trigger pulse. The purpose of the circuit is to produce a first pulse in the particular color channel (red or blue) in which it is connected if the label stripe under scan is retro-reflecting spectral energy in its particular color. In other words, if we have a blue or a white first stripe, we wish to produce a signal pulse in the blue channel and if the second stripe is also blue or white, we wish to produce a second pulse. These pulses should be standard in size and shape to facilitate further data processing; and, although the color stripes on the label are contiguous, the pulses must be separated to prevent their confusion with one another and permit their being bracketed by enabling gates in the subsequent data processing equipment.

The circuit operates in the following manner. Assuming that the input at terminal 606 is at zero volts before the +7 trigger signal is applied, transistor 602 will be in a non-conducting condition with its base clamped to ground via the combination of diodes 608 and 610. This results in its collector being at the substantially +12 volts to which its load resistor 612 is clamped by diode 614. Transistor 604 is conducting due to the positive bias on its base electrode via resistor 616. This causes the output signal at terminal 618 to be at substantially ground potential.

When the input pulse at terminal 606 rises to the positive potential indicated, it back biases diodes 608 and 610 to, in effect, disconnect the base electrode of transistor 602 from the input circuit applied to terminal 606 and the voltage divider comprised of resistors 620, 622, and 624. This causes the substantially 12 volt potential on bus 626 to be applied via resistor 628 to the base of transistor 602, thereby rendering it conductive and reducing its collector potential substantially to ground. This causes the current through resistor 616 to discharge capacitor 630, thereby cutting off transistor 604 and raising its collector potential to substantially the +12 volts of bus 626. Diode 632, as soon as the collector of transistor 604 switches positive becomes back-biased to isolate the output terminal 618 from the capacitor 634. This improves the rise time of the output pulse and enables the capacitor 634 to charge via resistor 636 and transistor 602.

When capacitor 630 has become sufficiently discharged (e.g. 5 microseconds in the circuit shown), transistor 604 is returned to conductive condition thereby returning its collector to ground and terminating the 5 microsecond pulse. Now, capacitor 634 starts to discharge via resistor 628 and for the time duration of this discharging cycle (approximately 15 microseconds for the circuit values shown) renders transistor 602 non-conductive.

At the end of the discharging cycle for capacitor 634 transistor 602 will again become conductive, if the positive trigger pulse is still present at input terminal 606 thereby initiating a second 5 microsecond output pulse. If the trigger input has returned to ground during the 15 microsecond interval between pulses, diodes 608 and 610 prevent the base of transistor 602 from swinging positive with reference to ground and keep that transistor in nonconductive condition thereby holding transistor 604 conductive and the output signal at substantially zero potential. If, however, the trigger potential remains high until a second output pulse has commenced and then is terminated during this second pulse, the output pulse will continue for approximately 5 microseconds due to the effective time constant of capacitor 634 charging through resistor 636 and transistor 602 thereby keeping this transistor conductive until capacitor 630 has discharged and rendered transistor 604 conductive to return the output signal to ground.

It is to be understood that the components and values suggested for this circuit may be modified and changed by those skilled in the art and that this particular gated multivibrator is only one means for accomplishing the pulse generating function desired. Substitutions may be employed without affecting the inventive concepts of the system under description.

In order to provide for maximum distinction between the orange and the blue information pulses, the pulse train in the blue channel is delayed (e.g. by 15 microseconds) and inverted by stage 70 so that, whereas orange information is processed through transformer 58 in the form of positive pulses at times $T_1$ and $T_2$, blue information is processed in the form of negative pulses at times $T_{1d}$ and $T_{2d}$.

The trackside components 26 of the wheel counting circuit are comprised of a wheel sensor 26′ and a pulse generator 26″ connected to a center tap on the output winding of transformer 58. The wheel sensor is comprised of an electromagnet mounted adjacent the rail and electrically connected in the tuned circuit of an oscillator contained in the pulse generator 26″. When the wheel of a railroad car enters the field of flux of the magnetic sensor 26′, the amplitude of the oscillator in the pulse generator circuit is reduced thereby producing a signal response which is detected to trigger a flip-flop circuit whose output signal is amplified and transmitted to the transformer 58.

The trackside equipment is in a de-energized quiescent condition until a train enters the rail block within which the scanner is located. At this time a signal input from the road bed block signal system 24 is utilized to energize the roadside scanner and also to actuate, via the center tap on the output winding of transformer 58, the label data processing and readout equipments 20 and 22.

*Label data processing and readout*

The equipment for converting the signal output of the roadside scanner into a decoded representation of the data transduced from the label may be located at the scanning site or at some remote station. Economy and reliability are more easily served if the label data is transmitted in real time to a remote location where storage and analysis may be performed in a more convenient and better controlled environment. If, however, the data processing takes place at the trackside, less bandwith is required for ultimate transmission of the final identification. For either type of data processing, the subsystems represented diagrammatically in FIG. 5 may be utilized.

The data processing equipment of FIG. 5 has as its input a transformer 72 connected by transmission line or radio link to the output transformer 58 of the scanning electronics. A block signal from the trackside equipment 24 is received, via the center tap circuit of transformers 58 and 72, to energize a signal device 74 (e.g. a relay) which actuates the rest of the data processing and readout equipment and provides whatever signal indication is desired to indicate that the trackside scanner is about to read a label. The center tap on the primary of transformer 72 also provides a circuit for connecting the wheel sensing pulses from the trackside unit 26 to the wheel counter and associated logic circuits 76. Since both the energized reader and the wheel counting signal pulses are transmitted on the transformer center tap circuit, they may be distinguished from each other by assigning to one a positive and to the other a negative polarity. The remainder of the data processing and readout equipment represented in FIG. 5 consists principally of a plurality of shift registers 78 with appropriate input, timing and control circuits and a conventional paper tape punch unit 80 of the type employed in teletypewriter communication systems. The positive going orange data pulses and negative going blue data pulses transmitted from transformer 58 are processed through transformer 72 to comparator circuits 82 where a threshold test is applied to distinguish label signals from background noise, and the orange pulses are then processed through a delay and inversion stage 84 to compensate for the delay and inversion which were applied to the blue information pulses at the trackside unit. Thus, after appropriate amplification and shaping by pulse shaping circuits 86, similar sized and shaped pulses are applied to terminals 88 and 90 to represent orange and blue data pulses, respectively.

As soon as a pulse is received at either of these two terminals, it is transmitted through OR gate 92 and INHIBIT gate 94 to the first in a series chain of sequentially triggered single pulse generators 96*a–d*. The first of these 96*a*, generates a pulse of 22.5 microsecond duration which enables buffer stage 98*a* to accept orange data pulses from terminal 88 and buffer stage 98*b* to accept blue data pulses from terminal 90. The trailing edge at the termination of the 22.5 microsecond pulse from pulse generator 96*a* initiates a 27.5 microsecond pulse from pulse generator 96*b*. This pulse disables gate 94 from retriggering the first pulse generator 96*a*, enables buffer stage 98*c* to accept orange data from terminal 98 and also enables buffer stage 98*d* to accept blue data from terminal 100. Thus, pulse generators 96*a* and 96*b* are triggered by the signal derived from a first label stripe to provide a sequence of two enabling gates straddling the line pulses representing data transduced from a combination of two stripes.

The trailing edge of the 27.5 microsecond pulse initiates a 7 microsecond pulse in pulse generator 96*c* which actuates the shift driver 102, through OR gate 104, to enable the first stages 781*a–d* of shift registers 78 to be set or reset in accordance with the data content of corresponding buffer stages 98*a*–98*d*. The trailing edge of the 7 microsecond pulse from generator 96*c* triggers a 5 microsecond pulse from pulse generator 96*d* which resets buffer stages 98*a–d* to their original quiescent condition in readiness for further label data.

The preceding cycle of operations has enabled buffer stages 98*a* and 98*b* to become energized for a 22.5 microsecond period in response to the scanning light beam intercepting the leading edge of the first one in any pair of label stripes, i.e. during time $T_1$ as shown in FIGS. 3*a–c*. Similarly, buffer stages 98*c* and 98*d* are enabled by the 27.5 microsecond pulse from pulse generator 96*b* to receive data from the second stripe of a pair during time $T_2$. There is no cross-over of data from the first stripe into stages 98*c* and 98*d* or from the second stripe into stages 98*a* and 98*b* because the signal pulses arriving at transformer 72 to represent the data content of these stripes are not conterminal with the scanning of the stripe in real time but are separated pulses produced by the gated multivibrator 66. The 22.5 microsecond gate produced by pulse generator 96*a* brackets the first of any pair of these pulses and the 27.5 microsecond gate produced by pulse generator 96*b* brackets the second.

When the system scans a second pair of stripes the leading edge of the first label data pulse initiates a second cycle similar to the one just described to load the label data into buffer stages 98*a–d*. When, however, the 7 microsecond gate from 98*c* pulses the shift driver 102, the data content of stages 781*a–c* is transmitted to the next stage down the register, leaving these stages available to accept data from buffer stages 98*a–d*. This process is repeated as long as the scanning optics is acquiring and the scanning electronics are transmitting signal data. The manner in which label information is distinguished from spurious signal inputs due to ambient light, accidental reflections, etc. is as follows.

Referring to FIG. 3*a*, a "start read" signal consists of an orange stripe followed by a blue stripe. If we assume that the presence of a signal in either one of the color channels at a gating time is to be considered as a binary one indication and the absence of a signal at such a time a binary zero, it may be stated that the "start read" instruction results in the introduction of a one signal, by a proper combination of digital signals on its two output lines, into the "*a*" series of shift registers 78, a zero into the "*b*" and "*c*" series and a one into the "*d*" series. Similarly, the "stop read" instruction at the end of the label consists of a blue stripe followed by an orange stripe. This introduces a zero into the "*a*" series of the shift registers 78, a one into the "*b*" and "*c*" series and a zero into the "*d*" series. Consequently, when a ten digit label has ben completely read, the "stop read" designation 0110 is in the first stages 781*a–d* of the registers 78, the "start read" signal 1001 is in their twelfth stages 7812*a–d* and the ten digits are encoded in their ten intermediate stages. This condition is sensed by logic circuits 108 and 110, respectively, to provide two of the three inputs required by AND gate 112 to energize the read flip-flop 114. These logic circuits 108 and 110 are comprised of the proper combination of gates to produce an output signal when the designated condition is present on the lines which constitute their input from the shift register stages concerned. The third input to the AND gate 112 is derived from the 5 microsecond gating pulse produced by pulse generator 96*d* to clear the buffer stages 98*a–d* after the data transduced from the last two stripes on the label has been processed to stages 781*a–d* of the shift registers 78. The effect of thus setting read flip-flop 114 is to commence the decoding and readout of the data contained in the shift registers 78. By withholding the readout operation until "start read" signals are in the twelfth and "stop read" signals are in the first stages of the registers 78, the system is made capable of processing spurious signals and noise through the shift registers while the scanner is energized by the block signal 24 but a label is not under scan without producing false readouts.

During this portion of the data processing cycle, OR gate 94 is disabled, via connection 116, to prevent the pulse generators 96*a–d* from being energized. This prevents further data from entering the shift registers until their signal content at the beginning of the readout cycle has been completely processed.

The particular label readout equipment represented in FIG. 5 is a tape punch subsystem for a teletypewriter communication link. It is, of course, understood that other types of readout and data utilization devices may be employed, e.g. line printer, automated controls for switching system, magnetic storage tapes, etc. In the arrangement shown for operating the tape punch unit 80, a signal from read flip-flop 114 energizes a code converter unit 118. This is a conventional converter matrix which changes the zero and one signal content of the final stages 7812*a–d* of the shift registers into standard five-line teletype code which energizes conventional solenoid drivers 120 to operate the paper tape punch 80.

The mechanical clutch driver 122 of the paper punch is energized by the read flip-flop 114 via gate 124 and OR gate 126. The flywheel (not shown) on the tape punch unit 80 is provided with a cam for closing an electrical circuit to gate 128 and pulse generator 130 which actuates the shift driver 102, via OR gate 104, to shift the data content of shift registers 78 a stage at a time as the tape punch 80 prints out a teletype encoded version of the digit represented by the data content of the final stage 7812*a–d* of the shift registers. After the tenth digit has ben punched out by the tape unit 80 the data content of stages 7812*a–d* is the 0110 indication of a "stop read" instruction. The complement of this condition is sensed by logic circuits 132, operating similarly to circuits 108 and 110, to transmit an inhibit pulse to gate 124 thereby de-energizing the clutch driver 122 in the paper punch equipment. This same circuit 132 also, when it senses the 0000 condition indicating that the label has been completely read out, resets the read flip-flop 114 to remove the inhibit signal via connection 116 to gate 94, thereby permitting the system to become sensitive to the input data of the next label to be read.

The effectiveness of this identification system is increased by the wheel counting operation which causes the readout equipment 80 to provide an all zero identification number or other suitable signal indication when an unlabeled car or a car with an unreadable label passes the scanning station. This subsystem operates in the following manner. As explained previously magnetic sensor 26′ mounted on the track causes the pulse generator 26″ in the trackside electronic package to transmit a pulse via the center tap circuit of transformers 58 and 72 to the wheel counter logic circuitry 76. Standard railroad cars are equipped with the four axle combination shown in FIG. 1. Consequently, if we accept as one of the ground rules for car labeling that the label be mounted behind the first left hand axle and forward of the second axle from the right, we can be assured that an unlabeled or inadequately labeled car has passed the scanning station if an impulse counter included in the circuitry represented by the wheel counter logic 76 achieves a count of seven, representing the last three axles of the labeled car and the four axles of the unlabeled car after reading a labeled car. When the block signal indicator 24 energizes the wheel counter logic 76 to indicate that a train has entered the block, this counter is automatically set to a count of three. This assures that if the locomotive is unlabeled, the count of seven which energizes the unlabeled car indication will be actuated when the four axles of the locomotive have been sensed. Similarly, an unlabeled car indication resets the counter, not to zero as is the case when a label is read, but to a count of three so that if a label is not read for the next car, its four axles will increase the count to seven and provide a second unlabeled car indication.

A significant feature of the present invention is that the speed of the scanning wheel 34, which is uniform, determines system timing and the two-stripe combination which provides each of the instruction and digit indications initiates its own enabling gates by means of the pulse generator sequential chain 96*a–d*. As a consequence, the label need not be one continuous sequence of evenly spaced stripes but its component pairs of stripes may be separated from each other to suit the convenience of structural members on the side of the labeled car, etc.

Another significant feature of the invention is that the four channel input to the code converter 118 permits, with the exception of three digits, direct conversion to the standard five-position teletype code. This is demonstrated by the schedule of FIG. 7 and represents a significant economy of circuitry in the converter 118.

Although the invention has been described with reference to the specifics of one illustrative embodiment, it is not limited to the details of this description but embraces the full scope of the following claims.

What is claimed is:

1. For the identification of objects in motion past a scanning station, an optical to electronic signal translating system comprising: a label carried by each object to be identified comprising a vertical array of substantially parallel horizontally oriented reflective stripes of substantially equal width arranged in accordance with a pre-established code to define alpha-numeric data unique to the object; at said scanning station, a source of radiant energy arranged to illuminate the area of said objects on which said labels are carried, means in close association with said source operative to scan said label in a direction substantially orthogonal to the direction of motion of said objects for receiving successively energy reflected from the individual stripes in said label including means operative to limit the energy received at any one time to that reflected from an area on said label having a vertical dimension no larger than the width of one of said stripes, translating means for generating a train of electrical pulse signals in response to said received energy, and means for converting said train of pulse signals into intelligent form.

2. For the system of claim 1, a label comprising a plurality of stripes formed of energy-reflective material arranged in a two-position, base four code, the two-position feature of said code comprising a two-stripe combination of first and second adjacent stripes, and the base four feature of said code comprising the selection of one color, from four given colors, for individual ones of the stripes in said two-stripe combination.

3. For the system of claim 1, a label comprising a plurality of stripes formed of retro-reflective material arranged in a two-position, base four code, the two-position feature of said code comprising the placement of first and second stripes adjacent each other in a two-stripe combination, and the base four feature of said code comprising the selection of individual ones of the stripes in said two stripe combination from stripes having four different spectral responses to incident energy of which one retro-reflects a significant amount of energy in a first portion of the color spectrum and no significant amount of energy in a second portion of the color spectrum, the second retro-reflects a significant amount of enery in said second portion of the color spectrum and no significant amount of energy in said first portion of the color spectrum, the third retro-reflects significant energy in both said first and second portions, and the fourth does not retro-reflect significant amounts of energy in either of said first and second portions of the color spectrum.

4. For the system of claim 1, a label comprising a sequence of two-stripe combinations of the retro-reflective materials wherein: the first combination of said sequence comprises a first stripe which is significantly retro-reflective in a first area of the color spectrum and not significantly retro-reflective in a second area of color spectrum and a second stripe which is significantly retro-reflective in said second area of the color spectrum and not significantly retro-reflective in said first area; the last combination of said sequence comprises a first stripe which is significantly retro-reflective in said second area and not significantly retro-reflective in said first area and a second stripe which is significantly retro-reflective in said first area and not significantly retro-reflective in said second area; and, the intermediate combinations of said sequence comprise selected first and second stripe arrangements of first material which is significantly retro-reflective in said first area and not in said second area, of second material which is significantly retro-reflective in said second and not in said first area, of third material which is significantly retro-reflective in both said first and said second areas and of fourth material which is not significantly retro-reflective in either said first or said second area.

5. For the identification of objects in motion past a scanning station, an optical to electronic signal translating system comprising, a label carried by each object to be identified comprising a vertical array of substantilly parallel horizontally oriented stripes of substantially equal width arranged in accordance with a two-position base-four code wherein each data item is encoded by various permutations of four colors in two locations of paired combinations of said stripes, said four colors including a first color which reflects significant amounts of energy in a first portion of the color spectrum and no significant amount of energy in a second portion of the spectrum, a second color which reflects significant amounts of energy in said second portion and no significant energy in said first portion, a third color which reflects significant amounts of energy in both said first and second portions, and a fourth color which does not reflect significant amounts of energy in either said first or second portions; at said scanning station, a source of radiant energy including said first and second colors arranged to illuminate the area of said objects on which said labels are carried, means closely associated with said energy source arranged to repetitively scan across said label in a direction substantially orthogonal to the direction of motion of said objects for successively receiving radiant energy reflected from individual ones of said stripes, first and second radiant-to-electrical energy transducers, means for directing received energy in said first portion of the color spectrum to said first transducer, means for directing received energy in said second portion of the spectrum to said second transducer, and means connected to said transducers operative to convert the electrical energy output therefrom into intelligent form.

6. Apparatus in accordance with claim 5 wherein said converting means comprises a first signal generating channel connected to said first transducer, a second signal generating channel connected to said second transducer, and means in each of said channels for converting the electrical signal response of its respective transducer to a standardized pulse indication of whether it has received significant radiant energy while the first or second locations of a paired combination of stripes are under scan.

7. Apparatus in accordance with claim 6, further including a data processing subsystem comprising: first, second, third and fourth shifting registers, means including a first gating circuit connecting said first and third registers to said first signal generating channel, means including a second gating circuit connecting said second and fourth registers to said second signal generating channel, said first gating circuit being activated in response to a standardized pulse indication occurring during a period of time corresponding to the time of reception of energy from the first location in said paired combination of stripes and said second gating circuit being activated in response to a standardized pulse indication occurring during a period of time corresponding to the time of reception of energy from the second location in said paired combination of stripes, means for shifting the data content of said shift registers as successive paired combinations of stripes are scanned, and means for deriving from said registers a decoded indication of said alpha-numeric data.

8. Apparatus in accordance with claim 7 wherein: the first paired combination of stripes in said array consists of a stripe of said first color in said first location and a stripe of said second color in said second location and constitutes a "start read" instruction, the last paired combination in said array consists of a stripe of said second color in said first location and a stripe of said first color in said second location and constitutes a "stop read" instruction, the paired combinations of stripes intermediate and first and last paired combinations constituting identifying data, and further including means connected to the final stage of said registers and operative to provide a first signal response to said "start read" instruction, means connected to the input stage of said registers to provide a second signal response to said "stop read" instruction, said means for deriving a decoded indication being actuated by a combination of said first and second signal responses occurring within a predetermined time period.

9. Apparatus in accordance with claim 8 including means for counting said objects passing said station and operative to provide a signal indication if one of the said objects is counted and a satisfactory decoded indication thereof is not processed.

10. The invention according to claim 8 wherein: said means for deriving a decoded indication comprises a four line data processing to five line teletypewriter code converter; said coded items represent the decimal digits 1 through 0 in the following manner:

| Decimal Number | Location One | Location Two |
|---|---|---|
| 1 | Third Color | Third Color. |
| 2 | Third Color | First Color. |
| 3 | First Color | Fourth Color. |
| 4 | First Color | First Color. |
| 5 | Second Color | Fourth Color. |
| 6 | Third Color | Second Color. |
| 7 | First Color | Third Color. |
| 8 | Third Color | Fourth Color. |
| 9 | Second Color | Second Color. |
| 0 | Second Color | Third Color. |

and, said registers are connected, via said converter, to said teletypewriter code lines as follows: register one to teletype line #1, register two to teletype line #5, register three to teletype line #2, register four to teletype line #3.

11. For the classification of objects passing a scanning station, said objects each carrying an information field including coded combinations of stripes which are sensitive to radiant energy and lie substantially parallel to the direction of motion of said objects past said station, apparatus comprising: a source of radiant energy, means for scanning said information field on objects passing said station with energy from said source in a scanning raster traversing said field in a direction substantially orthogonal to said direction of motion; means in close association with said scanning means for receiving radiant energy reflected from said stripes and for producing classification signals in response thereto, and means for counting said objects passing said station and operative to produce a signal indication, if one of said objects is counted and satisfactory classification signals therefor are not processed.

12. For the identification of objects in motion past a scanning station, an optical-to-electronic signal translating system comprising: a label carried by each object to be identified comprising a vertical array of substantially parallel horizontally oriented light-reflective stripes of substantially equal width arranged in accordance with a pre-established code to define alpha-numeric data unique to the object; at said scanning station, a source of light energy, means arranged to cause a beam of light from said source to repetitively scan across said label in a direction substantially orthogonal to the direction of motion of said objects and to receive light energy reflected from said label, means operative to limit the energy received at any one time to that reflected from an area on said label having a vertical dimension no larger than the width of one of said stripes, translating means for generating a train of electrical pulse signals in response to said received energy uniquely related to the arrangement of said stripes, and means for converting said train of pulse signals into intelligent form.

13. Apparatus in accordance with claim 12 wherein said scanning means comprises a wheel having reflective segments distributed about the periphery thereof supported for rotation in a vertical plane, and a half-silvered mirror arranged to direct light from said source onto said reflective segments and to transmit reflected light received on said reflective segments to said translating means.

14. Apparatus in accordance with claim 13 including means for driving said wheel at a predetermined uniform speed unrelated to the speed of travel of said objects past said scanning station.

15. For the identification of cars in motion past a trackside scanning station, an optical to electronic signal translating system comprising: a label carried by each car to be identified comprising a vertical array of substantially parallel horizontally oriented stripes from a selection of three different colored retro-reflective materials and a substantially non-reflective material arranged in two-stripe combinations in accordance with a pre-established code, said three colors of retro-reflective material including a first color retro-reflective of significant radiant energy in a first portion of the color spectrum but not in a second portion, a second color retro-reflective of significant radiant energy in said second portion but not in said first portion, and a third color retro-reflective of significant radiant energy in both said first and second portions; at said scanning station, a source of energy including said first and second colors, means arranged to cause a beam of radiant energy from said source to successively and repetitively illuminate the stripes in said label in a direction substantially orthogonal to the direction of motion of the cars and to receive radiant energy retro-reflective from said label, means including photoelectric means for separately detecting each of said colors, means operative to limit the received energy transmitted to said photo-electric means to no more than that reflected from a single stripe of said label, and means for converting the electrical output of said photo-electric means into intelligent form.

16. For the identification of vehicles in motion along a horizontal path past a scanning station, an optical-to-electronic signal translating system comprising: a coded identification label on the side of each vehicle to be identified comprising a vertical array of substantially parallel horizontally oriented stripes of retro-reflective material of at least two different colors arranged according to a pre-established code, said label being adapted for placement at random heights within a predetermined range on successive vehicles passing said scanning unit; at said scanning station, a source of light energy, means arranged to cause a beam of light from said source to repetitively scan the side of the vehicle on which said label is placed in a vertical direction over a field of scan encompassing said predetermined range of heights, and to receive light retro-reflected from said label, means operative to limit the light received at any instant to that reflected from an area having a vertical dimension no greater than the width of one of said stripes, translating means for generating a train of electrical pulse signals in response to said received light uniquely related to the color and arrangement of said stripes, and means for processing said electrical signals and operative to convert the data content of the label under scan to intelligent form.

17. For the identification and recording of data on vehicles in motion past a scanning station, an optical-to-electronic signal translating system comprising: a label carried on a side of each vehicle comprising a vertical array of substantially parallel, horizontal, stripes from a selection of three different colored retro-reflective materials and a substantially non-reflective material arranged in two-stripe combinations in accordance with a two-position, base-four code; at said reading station, a source of light energy, means arranged to cause a beam of light from said source successively and repetitively to scan the stripes of said label in the vertical direction as said vehicles move past said reading station and to intercept light energy retro-reflected from said label, photo sensitive pick-up means in close association with said beam-scanning means for receiving light energy intercepted by said beam-scanning means, said pick-up means including means arranged to limit the retro-reflected light transmitted to said photo-sensitive means to no more than that reflected from a single label stripe, and means for converting the electrical output of said photo sensitive means into intelligent form.

18. For the identification of objects, apparatus comprising: coded indicia of its identification attached to each object to be identified; said indicia comprising an informaton field divided into a plurality of substantially equal code areas each consisting of two adjacent stripes in various combinations of first, second and third colored retro-reflective materials and a relatively black material; said first color stripes having a major retro-reflective response to radiant energy in a first area of the color spectrum, said second color stripes having a major retro-reflective response in a second area of the color spectrum; said first and second color stripes each having relatively minimum retro-reflective response in the area of each others major response; said third color stripes having substantial retro-reflective response in both said first and second areas of the color spectrum; the black of said coding comprising areas having substantially no retro-reflective response in the respective spectral areas of major retro-reflective response of said first and said second color stripes; a scanning station having a label viewer; means for presenting said objects to said scanning station with their labels exposed to said viewer; said viewer comprising a source of radiant energy in the spectral areas of both said first and said second major retro-reflective responses; a rotatable member having a plurality of radiant-energy-reflective areas; means for rotating said member so that said areas intercept energy from said source and cause it to scan across a label presented to said viewer, said scan being in a path which intercepts all of the component stripes of the label; a dichroic optical system arranged in the path of energy emanating from said source and retro-reflected from said label, said system including means for limiting the amount of said retro-reflected energy being processed at any one time to that from an area having a lateral dimension no larger than the width of one of said stripes, and means for diverting retro-reflected energy in said first spectral area into a first path and energy in said second spectral area into a second path; a first optical-electronic signal transducer located in said first path; a second optical-electronic transducer located in said second path; first, second, third and fourth pulse shifting registers, each having corresponding input, final and intermediate stages; substantially parallel connections between said first transducer and the input stages of said first and third registers; substantially parallel connections between said second transducer and the input stages of said second and fourth registers; means for processing through the combination of said first and second registers data transduced from the first stripe of said two-stripe combinations; means for processing through the combination of said third and fourth registers data transduced from the second stripe of said two-stripe combinations; means for shifting the data transduced from the first and second stripes of each of said two-stripe combinations as a parallel four bit binary expression through the intermediate stages of said four registers to their respective final stages; and, means for translating the data content of said registers at a given time to decode the indicia scanned.

19. For the identification of transport vehicles, classified by combinations of decimal numbers, while they are in motion past a roadside scanning station, apparatus comprising: coded indicia of its decimal number attached to each vehicle to be identified; said indicia comprising a label divided into a plurality of substantially equal decimal number code areas each consisting of two adjacent stripes of various combinations of first, second and third colored retro-reflective materials and a relatively non-retro-reflective material; all of the information stripes of said labels having substantially the same width; said first color stripes having a major retro-reflective response in a first area of the color spectrum, said second color stripes having a major retro-reflective response in a second area of the color spectrum; said first and second color stripes each having relatively minor reflective response in the area of each others major response; said third color having substantial retro-reflective response in both said first and second areas of the color spectrum; the black of said coding comprising an area having substantially no retro-reflective response in the respective spectral areas of said first and second retro-reflective responses; a label viewer at said scanning station; means for exposing said labels to said viewer with the stripes of said labels lying substantially parallel to the direction of motion of said objects; said viewer comprising a light source which radiates energy in the spectral area of both said first and said second retro-reflective responses; a rotatable member having a plurality of light-reflective areas; means for rotating said member so that said areas intercept light from said source and cause it to scan across a label presented to said viewer, said scan being in a path which intercepts all of the component stripes of the label; a dichroic optical system arranged in the path of light emanating from said source and retro-reflected from said label, said optical system including means for limiting the amount of said reflected light being processed at anly one time to that reflected from an area having an effective lateral dimension no larger than the width of one of said stripes, and means for diverting reflected light in said first spectral area into a first path and light in said second spectral area into a second path; a first optical-electronic signal transducer located in said first path; a second optical-electronic signal transducer located in said second path; first, second, third and fourth pulse shifting registers, each having corresponding input, final and intermediate stages; substantially parallel connections between said first transducer and the input stages of said first and third registers; substantially parallel connections between said second transducer and the input stages of said second and fourth registers; means for processing through the combination of said first and second registers data transduced from the first stripe of said two-stripe combinations; means for processing through the combination of said third and fourth registers data transduced from the second stripe of said two-stripe combinations; means for shifting the data transduced from the first and second stripes of each of said two-stripe combinations as a parallel four bit binary expression through the intermediate stages of said four registers to their respective final stages; and, means for decoding the data content of said final stages to indicate the decimal identity of the two-stripe combinations represented thereby.

20. For the identification of vehicles in motion past a roadside scanning station, apparatus comprising: an information field on each vehicle to be identified; said field including stripes from a selection of three different colored retro-reflective materials and a non-retro-reflective material arranged in two-stripe combinations in accordance with a two-position, base-four, code with the component stripes of the label lying substantially parallel to the roadbed at said station; said three colors of retro-reflective materials including a first color retro-reflective of significant radiant energy in a first area of the color spectrum but not in a second area, a second color retro-reflective of significant radiant energy in said second area but not in said first area, and a third color retro-reflective of significant radiant energy in both said first and said second areas; said information field including "start read" data in its first two-stripe combination, "stop read" data in its final two-stripe combination, and identification data in intermediate combinations; a label viewer located at said station; said viewer including a source of radiant energy, first and second radiant energy to electronic signal transducers, and an optical system; said optical system including a rotating member having a plurality of reflecting surfaces around its periphery and being arranged to reflect radiant energy from said source in a scanning raster across the component stripes of labels carried past said viewer by said vehicles, and a member having a surface partially reflecting of and partially transparent to said radiant energy, said member being arranged to reflect said energy from said source to said reflecting surfaces on said rotating member and to transmit retro-reflected energy from said label via said surfaces to said transducers; a dichroic mirror arranged to direct retro-reflected energy in said first area of the spectrum to said first transducer and retro-reflected energy in said second area of the spectrum to said second transducer; an optical mask arranged to limit the retro-reflected energy transmitted to said transducers at any one time to no more than that derived from a single label stripe; a first signal channel connected to said first transducer; a second signal channel connected to said second transducer; means for providing in each of said channels in response to a scanning of the first and second stripe in each two-stripe combination a first signal pulse if the transducer connected to the channel concerned is energized by the scanning of said first stripe, a second signal pulse if said connected transducer is energized by the scanning of said second stripe, and first and second signal pulses if said connected transducer is energized by the scanning of both stripes in a two-stripe combination; and, means for converting said signal pulses into identification signals, said means including first and third pulse shifting registers having gated connections to said first signal channel, second and third pulse shifting registers having gated connections to said second signal channel, means actuated by a first signal pulse for energizing said gated connections to said first and third registers during the occurrence of said first signal pulses and said gated connections to said second and fourth registers during the occurrence of said second signal pulses and for shifting the data content of said registers through successive stages of said registers as successive two-stripe combinations are scanned, means connected to the final stages of said registers for providing a signal response to the presence therein of a "start read" code indication, means connected to the input stage of said registers for providing a signal response to the presence therein of a "stop read" code indication, and means actuated by a combination of said "start read" and "stop read" responses for decoding the data content of the intermediate stages of said registers to provide a signal indication of the vehicle identification represented by their data content.

21. For the identification of objects in motion past a scanning station, an optical to electronic signal translating system comprising: a label carried by each object to be identified comprising a vertical array of substantially parallel horizontally oriented light-reflective stripes of substantially equal width arranged in a two position base four code to define alpha-numeric data unique to the object; at said scanning station, a source of light energy, means arranged to cause a beam of light from said source to repetitively scan across said label in a direction substantially orthogonal to the direction of motion of said objects, means arranged to receive and examine light energy reflected from said label including means operative to limit the received energy examined at any one time to that reflected from an area on said label having a vertical dimension no larger than the width of one of said stripes, translating means for generating a train of electrical pulse signals in response to said received energy uniquely related to the arrangement of said stripes, and means for processing said electrical signals to decode the data content of the array under scan.

22. For the identification of vehicles in motion along a horizontal path past a scanning station, an optical to electronic signal translating system comprising: a label carried on a surface of each vehicle to be identified comprising a vertical array of substantially parallel, horizontally oriented substantially equal width retro-reflective stripes of predetermined length, said stripes being of four different colors and arranged in a two position, base four code to define alpha-numeric data unique to the vehicle, said label being affixed to the vehicle at a random distance above said path; at said scanning station, a source of light energy, means arranged to cause a beam of light from said source having a horizontal dimension significantly greater than the length of said stripes to repetitively scan the surface of the vehicle carrying the label in a vertical direction over a field of scan extending from a point less than said random distance from said path to a point significantly above said label, means arranged to receive energy reflected from said label including means operative to limit the energy received at any instant to that reflected from an area having a vertical dimension no greater than the width of one of said stripes, translating means for generating a train of electrical pulse signals in response to said received energy uniquely related to the color and arrangement of said stripes, and means for processing said electrical pulse signals and operative to decode the data content of the label under scan.

References Cited by the Examiner

UNITED STATES PATENTS

| | | | |
|---|---|---|---|
| 2,261,542 | 11/1941 | Dickinson | 235—61.11 |
| 2,268,498 | 12/1941 | Bryce | 235—61.115 |
| 2,294,679 | 9/1942 | Mavl | 235—61.11 |
| 2,953,300 | 9/1960 | O'Brien | 235—61.12 |
| 2,968,793 | 1/1961 | Bellany | 235—61.115 |
| 2,978,675 | 4/1961 | Highleyman | 235—61.115 |
| 3,026,029 | 3/1962 | Daniels | 235—61.12 |
| 3,145,291 | 8/1964 | Brainerd | 235—61.11 |

ROBERT C. BAILEY, *Primary Examiner.*

WALTER W. BURNS, Jr., MALCOLM A. MORRISON, *Examiners.*